UNITED STATES PATENT OFFICE.

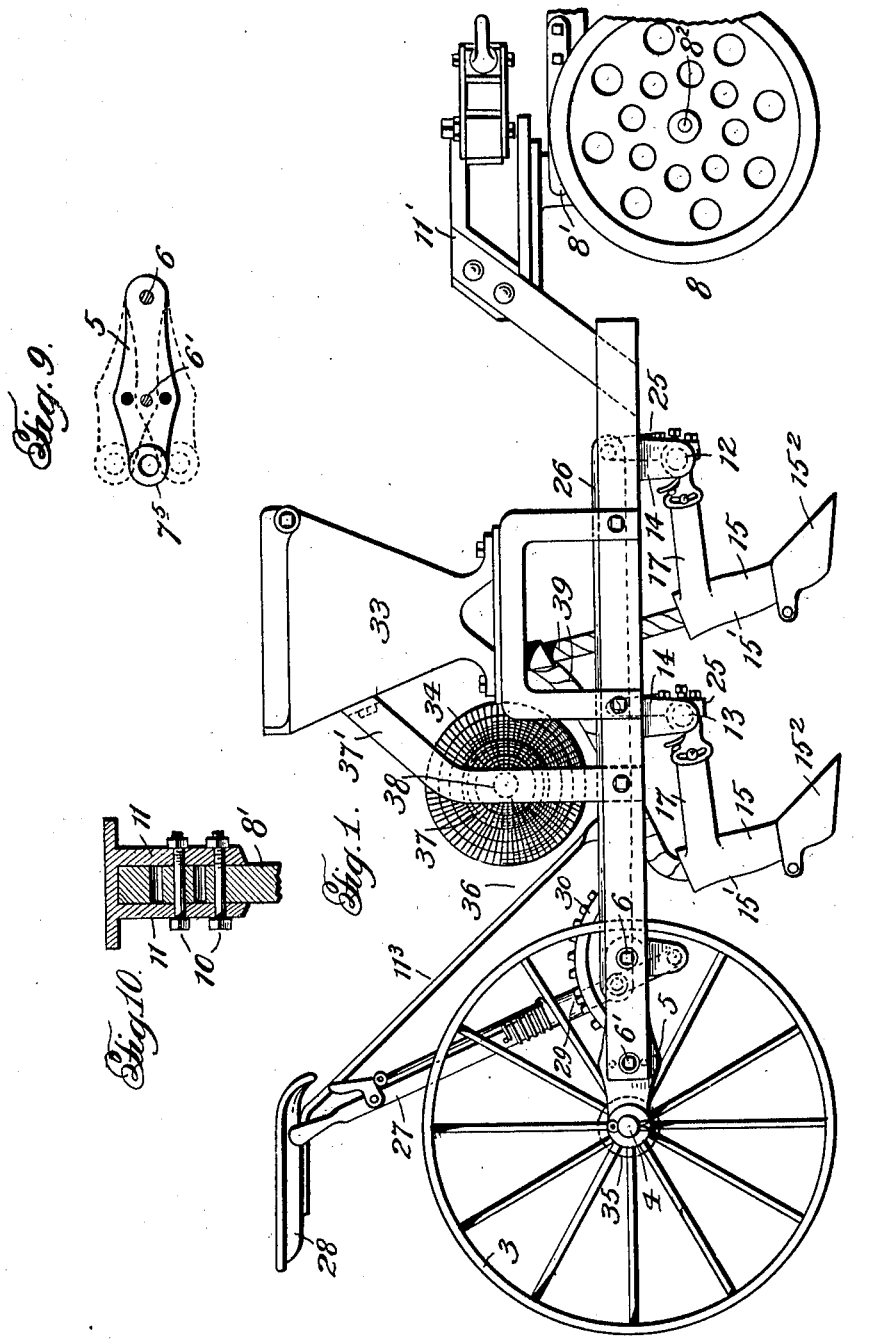

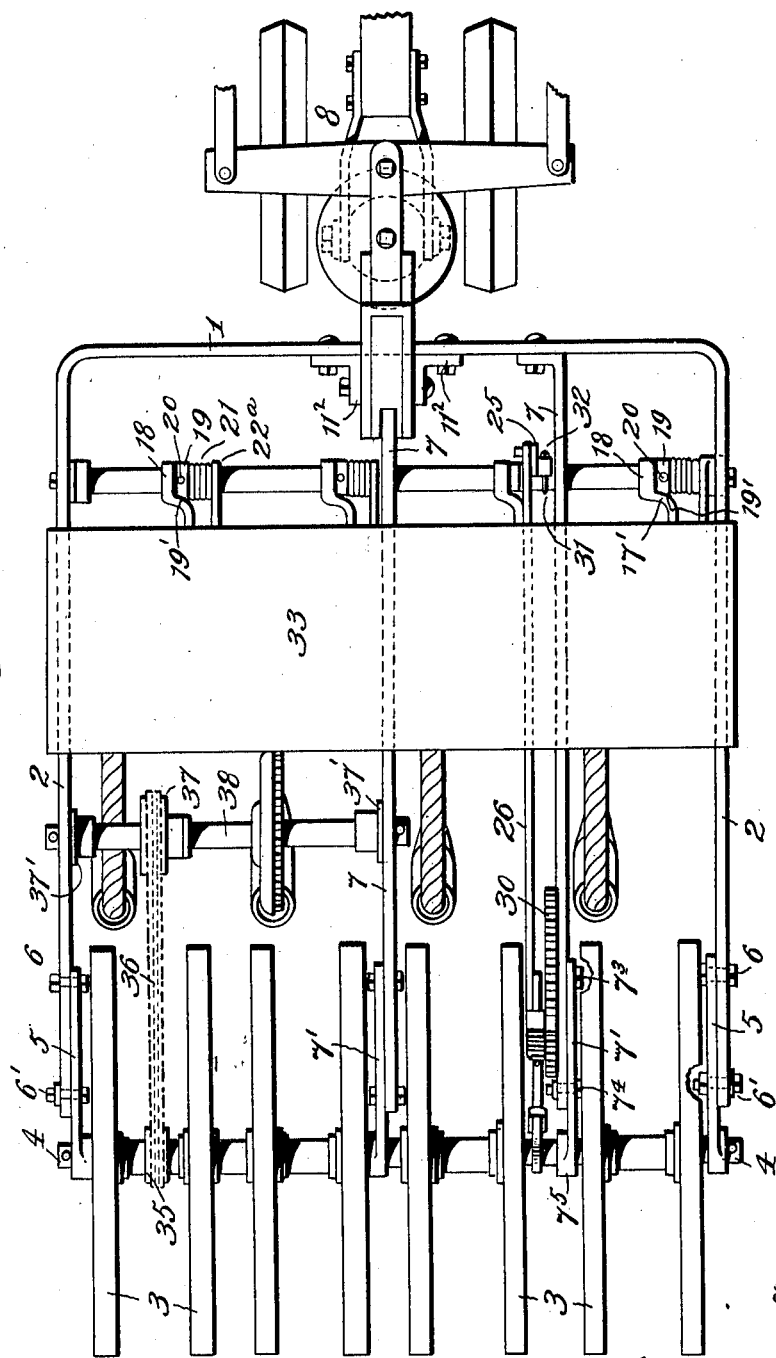

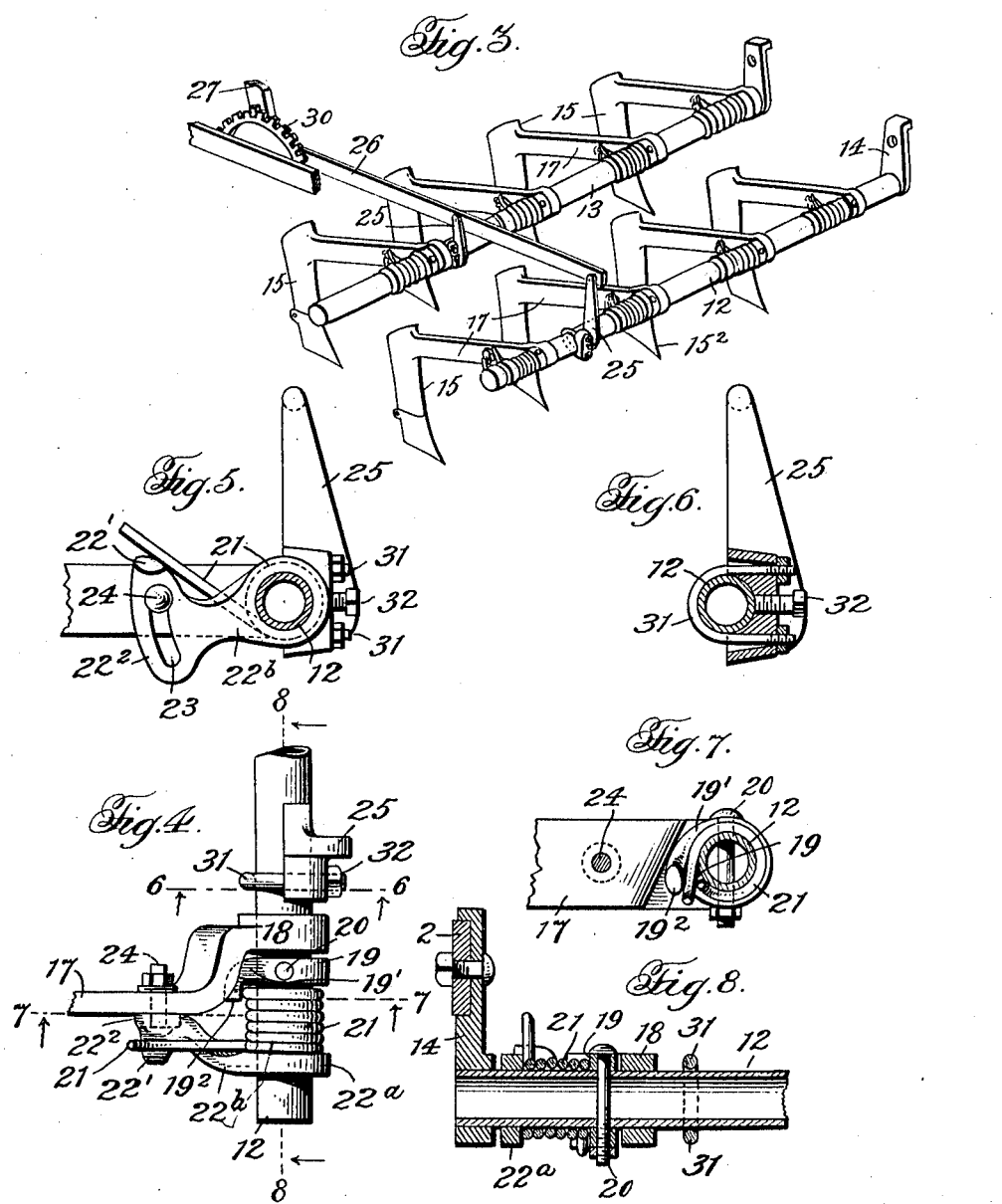

WILLIAM FETZER, OF SPRINGFIELD, ILLINOIS.

GRAIN-DRILL.

1,314,863. Specification of Letters Patent. Patented Sept. 2, 1919.

Application filed January 31, 1918. Serial No. 214,597.

*To all whom it may concern:*

Be it known that I, WILLIAM FETZER, a citizen of the United States, residing at Springfield, in the county of Sangamon and State of Illinois, have invented certain new and useful Improvements in Grain-Drills, of which the following is a specification, reference being had therein to the accompanying drawing.

This invention relates to improvements in grain drills and has for its object to simplify the construction of such machines, to provide a more compact structure, to reduce the weight and likewise the cost thereof, and to make them lighter in draft.

An important novel characteristic of the invention resides in the provision of draw bars that are adapted to be rotated or rocked, and in combination therewith drilling instrumentalities of the hoe or runner type that are relatively light in weight and have substantially upright or vertically extending seed conduit portions with a furrow opener portion at the lower end thereof, the hoe drills being connected to the bars by relatively short arms extending forwardly from the seed conduit portions of the hoe drills, to be drawn by the bars and to be lifted and lowered by rotating the bars, said bars constituting combined pull and pressure bars and also means for raising and lowering the hoe drills, the usual long drag bars and the separate raising and lowering mechanism connected in rear of the pivots of the draw bars being entirely dispensed with.

An important novel feature of the invention also lies in the provision of a low down frame structure supported at the front by a tongue truck and at the rear by presser wheels or the like. Such a low down structure is primarily important because it permits of the use of relatively short connecting arms between the hoes and the combined pull and presser bars, it being appreciated, in this connection, that the tongue truck support at the front and the wheel support at the rear are highly essential to the low down frame structure. In the balanced type of machine commonly employed with the axle under the hopper, the frame and hopper are necessarily located relatively high, and the use of the combined pull and presser bar in this high frame type of machine would be impracticable on account of the long arm connections required between the presser bar and hoes.

Other important novel characteristics of the invention lie in the special pressure mechanism provided for yieldably maintaining the drilling instrumentalities down to their work and permitting them to readily ride over obstructions without injury thereto; and also in the special adjusting mechanism provided for the rotatable draw and presser bars.

The invention, with other objects and advantages thereof, and the particular construction, combination and arrangement of parts comprising the same will be understood from the hereinafter contained detail description when considered in connection with the accompanying drawings forming part hereof and illustrating one embodiment of the invention.

In the drawings:

Figure 1 is a side elevation of a grain drill constructed in accordance with the invention.

Fig. 2 is a top plan view with the seed hopper and associated feed mechanism removed.

Fig. 3 is a detail perspective of the rocking draw bars and the adjusting means therefor.

Fig. 4 is a detail top plan of the section of one of the rock bars showing the spring pressure mechanism for one of the drills, and the rock arm connected with the bar.

Fig. 5 is an end elevation of the structure illustrated in Fig. 4.

Fig. 6 is a vertical section on the line 6—6 of Fig. 4 looking in the direction of the arrow.

Fig. 7 is a vertical section on the line 7—7 of Fig. 4 looking in the direction of the arrow.

Fig. 8 is a vertical longitudinal section on the line 8—8 of Fig. 4.

Fig. 9 is a detail side elevation of one of the adjustable bearing brackets for the rear axle, and Fig. 10 is a detail view, on an enlarged scale, of the adjustable connection between the axle and upper part of the truck.

The frame of the machine is shown as comprising a front bar 1 and end bars 2, the bars being shown integral as a substantially U-shaped member. The frame is supported at the rear by a plurality of presser wheels 3 fixed to an axle 4 supported at opposite ends for rotation in bearings carried by brackets 5 that are adjustably secured to the end bars 2 of the frame by bolts 6—6'. 7 designates intermediate bars of the frame, and 7' are brackets adjustably secured to the bars at their rear ends by bolts 7³—7⁴ and provided with bearing eyes 7⁵ loosely engaging the axle 4, the bars being rigidly secured at their front ends to the front bar 1 of the frame, one of said bars 7 being disposed substantially centrally of the end bars 2. At its forward end the frame is supported by a tongue truck 8, which has a vertically adjustable connection with the frame, the vertically extending portion 8' of the axle 8² of the truck being secured by bolts 10 between spaced depending arms 11 that are connected with the front bar 1 of the frame. The tongue truck has rearwardly extending spaced parallel arms 11', the outer end portions of which are disposed on opposite sides of the forward portion of the central intermediate beam 7 and secured thereto by bolts or the like, angle brackets 11² being provided at each side of the parts. To this centrally disposed beam 7, which as shown is relatively stout and heavy, is secured the seat post 11³. This special arrangement of parts including the centrally disposed extending beam 7, with the tongue truck connected thereto at the front thereof and also providing a support for the seat post, affording a very simple and at the same time a strong rigid structure.

At the forward portion of the frame arranged one in advance of the other are bars 12—13. The bars are supported for rotation or rocking movement in bearings of the lower ends of hangers 14 depending from the side and intermediate bars 2 and 7 of the frame. Connected to the bars to be drawn thereby and also to be raised and lowered by rotating the bars are gangs of drills 15, the drills of the rear gang being arranged in staggered relation respecting the drills of the front gang to work intermediate the same in the spaces therebetween. The drills are of the type that is relatively light in weight and has a substantially vertically extending seed conduit portion 15' with a furrow opening portion 15² at the lower end thereof, the furrow opening portion 15² being shown formed as a separate part and detachably secured to the seed conduit portion 15'. The drills are connected to the bars 12—13 by arms 17 extending forwardly from their seed conduit portions above their furrow opening portions and having sleeves 18 at their outer ends loosely engaging the bars, yieldable connections being provided between the arms and bars whereby the arms are adapted to have a limited yielding rotary movement about the bars so that the drills are held to their work with an elastic pressure and permitted to readily ride over obstructions without injury. At intervals along the bars are fixed collars 19, the collars being shown secured to the bars by bolts 20 passing through the collars and bars, and the sleeve 18 of the arm of each drill fits against one side of one of the collars 19, the arms adjacent the collars having offset portions 17'. Each collar 19 has a radial extension 19' with a laterally projecting lug 19², the latter forming a bearing for one end of a coil spring 21. 22ᵃ is a sleeve loosely engaging the bar at the other side of the spring 21, said sleeve having a laterally offset extension 22ᵇ secured to the arm 17 and provided with a lug 22' against which the opposite end of the spring bears. The extension 22ᵇ has a segmental shaped part 22² that is clamped against one side face of the arm 17 by a bolt 24, the part 22ᵇ having an elongated slot 23, the connection being adjustable so that the position of the sleeve 22 with its lug 22' can be changed to vary the tension of the spring 21. The parts normally occupy the position indicated in Fig. 4 of the drawings, the inner end of the arm at its under side being held against the radial extension of the fixed collar 19, said radial projecting portion constituting a stop for limiting the movement of the arm about the bars in one direction.

The means for rotating the bars to adjust and to lift and lower the drills comprises crank arms 25 on the bars 12—13 pivotally connected to a rod 26, which extends rearwardly and is pivotally connected to a hand lever 27. The hand lever which is located adjacent the operator's seat 28 is pivoted at its lower end to the frame, and is provided with a spring pressed pawl 29 which coöperates with a segmental rack 30 to lock the lever in different positions of adjustment. In order to provide for the simultaneous adjustment of both gangs of drills with the depth of one gang less than that of the other, the crank arms 25 are secured to the bars for angular adjustment. The crank arms 25 are shown clamped to the bars by U-bolts 31 and held fixed against rotation by a set screw 32. 33 designates a seed hopper located intermediate the front and rear sides of the frame and provided with seed cups and gearing 34 of conventional form. The gearing 34 is located at the rear side of the hopper and is driven from the presser wheel 3, the axle 4 having a driving pinion 35 connected by a drive chain 36 with a pinion 37 on a counter shaft 38 supported in brackets 37' and suitably connected with the gearing 34. 39 designates flexible seed spouts extending from the delivery cups of the hopper to the upper ends of the seed conduit portions of the drills.

It will be observed that by the particular construction hereinbefore described the usual long drag bars and the separate raising and lowering mechanisms located in rear of the pivotal connection of the drag bars with the draw bars, are entirely dispensed with, the structure being much simplified and the weight of the machine being reduced to a substantial extent, more than one third of the weight of the standard type of drill in present day use, with a material saving in the cost of manufacture, and the structure being much lighter in draft.

The particular combination or use of the type of drill referred to with the combined rotating pull and pressure bars is a highly important characteristic of the invention. This type of drill is relatively light in weight, requires relatively little pressure, in operation occupies a substantially vertical position, and makes practical the use of the draw bar also as pressing and lifting and lowering means for the drills.

The low down frame structure is of vital importance in the combination as it permits of the use of relatively short connecting arms between the drills and the rotating pull and presser bars. The resulting structure is of a very compact nature. With the low down frame and the relatively short connecting arms less space is required for the swinging of the drills in adjusting the same, and the gangs of drills can be placed closer together. It will be appreciated that the tongue truck support at the front and the wheel support at the rear of the frame are highly essential to the low down frame structure. In the balanced type of machine commonly employed with the axle under the hopper, the frame of the machine and hopper are necessarily located relatively high, and the use of the combined pull and presser bar in this balanced type of machine would be impossible on account of the long arm connection required between the presser bar and hoes, the weight of the drilling instrumentalities with the long arms required, and the force necessary to lift or turn the same about the pull bars making such a construction entirely impracticable. The low down frame construction also has the advantage that the seed hopper occupies a much lower position so that it is easier for the operator to fill the same with seed, and the operator's seat does not have to be placed as high in order to permit the operator to see the land directly ahead of the machine.

While I have illustrated in the drawings a specific embodiment of the invention, it will of course be understood that changes and variations in the particular construction shown, as will appeal to those skilled in the art and falling within the scope of the appended claims may be made without departing from the spirit of the invention.

What I claim is:

1. In a grain drill, the combination with a rotatable pull and presser bar, of a plurality of hoe drills each having a substantially upright seed conduit portion with a furrow opening portion at the lower end thereof, means extending forwardly from the seed conduit portion of each hoe drill above the furrow opening portion and connecting the seed conduit to the pull and presser bar to be drawn thereby and to be lifted and lowered by rotating the bar, and means for rotating and locking the bar in adjusted position.

2. In a grain drill, the combination with a rotatable pull and presser bar, of a plurality of hoe drills, each having a substantially upright seed conduit portion with a furrow opening portion at the lower end thereof, an arm extending forwardly from the seed conduit portion of each hoe drill above the furrow opening portion and connecting the hoe drill to the pull and presser bar to be drawn thereby and to be lifted and lowered by rocking the bar, and means for rotatably adjusting said bar.

3. In a grain drill, the combination with a rotatable pull and presser bar, of a plurality of hoe drills, each having a substantially upright seed conduit portion with a furrow opening portion at the lower end thereof, and means connecting the seed conduit portion of each hoe drill of the drill with the bar to be drawn thereby and to be lifted and lowered by rotating the bar, and providing for a yielding movement of the drill about the bar.

4. In a grain drill, the combination with a rotatable pull and presser bar, of a plurality of hoe drills, each having a substantially upright seed conduit portion with a furrow opening portion at the lower end thereof, and means connecting the drills to the pull and presser bar to be drawn thereby and to be lifted and lowered by rotating the bar, said means including an arm extending forwardly from the conduit portion of each hoe drill above the furrow opening portion, and yieldable connections between the bar and arms.

5. In a grain drill, the combination with a rotatable pull and presser bar, of a plurality of drills, each having a substantially upright seed conduit portion with a furrow opening portion at the lower end thereof, an arm extending forwardly from the seed conduit portion above the furrow opening portion and provided with a sleeve loosely engaging the bar, and a spring connected at one end with the bar and connected at its other end with said arm, the spring acting to press the arm downwardly, and means for rotatably adjusting said bar.

6. In a grain drill, the combination with a rotatable pull and presser bar, of a plurality of drills, each having a substantially upright seed conduit portion with a furrow opening portion at the lower end thereof, an arm extending forwardly from the seed conduit portion above the furrow opening portion and provided with a sleeve loosely engaging the bar, a spring connected at one end with the bar and connected at its other end with said arm, the spring acting to press the arm downwardly, means for rotatably adjusting said bar, and means on the bar to limit the rotary movement of the sleeve on the bar in one direction.

7. In a grain drill, the combination with a rotatable pull and presser bar, of a plurality of drills, an arm extending forwardly from each drill, said arm having a sleeve loosely engaging the bar, a second sleeve loosely engaging the bar and having a radially projecting portion adjustably secured to the arm, a coiled spring on the bar between the sleeves connected at one end with the bar, and having its opposite end bearing against said radially projecting portion.

8. In a grain drill, the combination with a rotatable pull and presser bar, of a plurality of drills, an arm extending forwardly from each drill, a collar fixed on the bar, said arm having at its outer end spaced sleeves, one of the sleeves bearing against one side of the collar, and the other sleeve being located at the other side of the collar in spaced relation thereto, and a coiled spring interposed between the collar and the last mentioned sleeve, one end of the spring being connected with the bar and the opposite end of the spring bearing against the arm.

9. In a grain drill, the combination with a rotatable pull and presser bar, of a plurality of drills, an arm extending forwardly from each drill, a collar fixed on the bar, said arm having at its outer end spaced sleeves, one of the sleeves bearing against one side of the collar, and the other sleeve being located at the other side of the collar in spaced relation thereto, and a coiled spring interposed between the collar and the last mentioned sleeve, one end of the spring being connected with the bar and the opposite end of the spring bearing against the arm, said collar being provided with means for limiting the rocking movement of the bar in one direction.

10. In a grain drill, the combination with a rotatable pull and presser bar, of a plurality of drills, an arm extending forwardly from each drill, a collar fixed on the bar, said collar having a lateral projection at one side thereof, the arm having an offset portion provided with a sleeve positioned at one side of the collar, a second sleeve loosely engaging the bar at the other side of the collar, and having a radially projecting laterally offset extension having a segmental shape part provided with a slot, a bolt engaging the slot in the segmental shape part and adjustably clamping the same to the arm, and a coiled spring on the shaft between the hub and the last mentioned collar, one end of the spring bearing against the lateral projection of the collar, and the other end of the spring bearing against the offset extension of said sleeve, and means for rotatably adjusting the bar.

11. In a grain drill, the combination with a plurality of rotatable pull and presser bars, of a plurality of drills connected with each of said bars to be drawn thereby and to be raised and lowered by rotating the bars, and means for rotatably adjusting said bars, said means including crank arms on the bars, a hand lever pivotally connected with the frame, and a pivotal link connection between the hand lever and the arms, said arms being secured to the bars for angular adjustment relative thereto.

12. In a grain drill, the combination of a frame, a plurality of rotatable pull and presser bars on the frame, a plurality of hoe drills connected with the pull and presser bars, each of said drills having a substantially upright seed conduit portion with a furrow opening portion at the lower end thereof, means extending forwardly from the seed conduit portion of each hoe drill above the furrow opening portion thereof and connecting the drill to the pull and presser bar to be drawn thereby and to be lifted and lowered by rotating said bar, means for rotating and locking said bars in adjusted position, a tongue truck supporting the frame at the front thereof and press wheels supporting the frame at the rear.

13. In a grain drill, the combination of a frame, a plurality of rotatable pull and presser bars on the frame, a plurality of hoe drills connected with the pull and presser bars, each of said drills having a substantially upright seed conduit portion with a furrow opening portion at the lower end thereof, an arm extending forwardly from the seed conduit portion of each hoe drill above the furrow opening portion thereof and connecting the drills to the pull and presser bar to be drawn thereby and to be lifted and lowered by rocking the bar, means for rotatably adjusting said bars, a tongue truck supporting the frame at the front thereof, and press wheels supporting the frame at the rear.

14. In a grain drill, the combination of a frame, a plurality of pull and presser bars on the frame, a plurality of hoe drills connected with each pull and presser bar, each of said hoe drills having a substantially upright seed conduit portion with a furrow opening portion at the lower end thereof, means connecting the hoe drills to the pull and presser bar to be drawn thereby and to be lifted and lowered by rotating the bar, said means including an arm extending forwardly from the seed conduit portion of each hoe drill above the furrow opening portion thereof, and yieldable connections between the bar and arms, a tongue truck supporting the frame at the front thereof, and press wheels supporting the frame at the rear.

15. In a grain drill, the combination of a frame, a plurality of pull and presser bars on the frame, a plurality of hoe drills connected with each pull and presser bar, each of said drills having a substantially upright seed conduit portion with a furrow opening portion at the lower end thereof, means connecting the hoe drills to the pull and presser bar to be drawn thereby and to be lifted and lowered by rotating the bar, said means including a direct securement from the seed conduit portion of each hoe drill above its furrow opening portion, and yieldable connections between the bar and the seed conduit portions.

16. In a grain drill, the combination with a rotatable pull and presser bar, of a plurality of drills, an arm extending forwardly from each drill, the arm having a sleeve loosely engaging said bar, a part loosely engaging the bar and adjustably secured to the arm, a coiled spring on the bar connected at one end with the bar, and having its opposite end bearing against said part.

17. In a grain drill, the combination with a rotatable pull and presser bar, of a plurality of drills, an arm extending forwardly from each drill, a collar fixed on the bar, said arm having at its outer end spaced sleeves, one of the sleeves being positioned at one side of the collar, and the other sleeve being located at the other side of the collar in spaced relation thereto, and a coiled spring interposed between the collar and the last mentioned sleeve, one end of the spring being connected with the bar and the oposite end of the spring bearing against the arm.

18. In a grain drill the combination of a rotatable pull and presser bar, of a plurality of hoe drills, each having a substantially upright seed conduit portion with a furrow opening portion at the lower end thereof, a straight arm extending forwardly from the seed conduit portion of each hoe drill above the furrow opening portion thereof and connecting the hoe drill to the pull and presser bar to be drawn thereby, and means for rotatably adjusting said bar.

19. In a grain drill, the combination with a rotatable pull and presser bar, of a plurality of hoe drills, each hoe drill having a substantially upright seed conduit portion with a furrow opening portion at the lower end thereof, a rigid arm extending forwardly from the seed conduit portion of each hoe drill above the furrow opening portion thereof and directly connected with the pull and presser bar, and means for rotatably adjusting said bar.

20. In a grain drill, the combination with a rotatable pull and presser bar, of a plurality of hoe drills, each having a substantially upright seed conduit portion with a furrow opening portion at the lower end thereof, a relatively short arm extending forwardly from the seed conduit portion of each hoe drill above the furrow opening portion thereof and directly connected to the pull and presser bar, and means for rotatably adjusting said bar.

21. In a grain drill, the combination with a rotatable pull and presser bar, of a plurality of hoe drills, each having a substantially upright seed conduit portion with a furrow opening portion at the lower end thereof, a rigid arm extending forwardly from the seed conduit portion of each hoe drill a substantial distance above the furrow opening portion thereof and directly connected with the presser bar for rotation thereon, and means for rotatably adjusting said bar.

In testimony whereof I hereunto affix my signature in the presence of two witnesses.

WILLIAM FETZER.

Witnesses:
M. EBERDING,
W. B. FAGAN.

Copies of this patent may be obtained for five cents each, by addressing the "Commissioner of Patents, Washington, D. C."